Patented Apr. 24, 1951

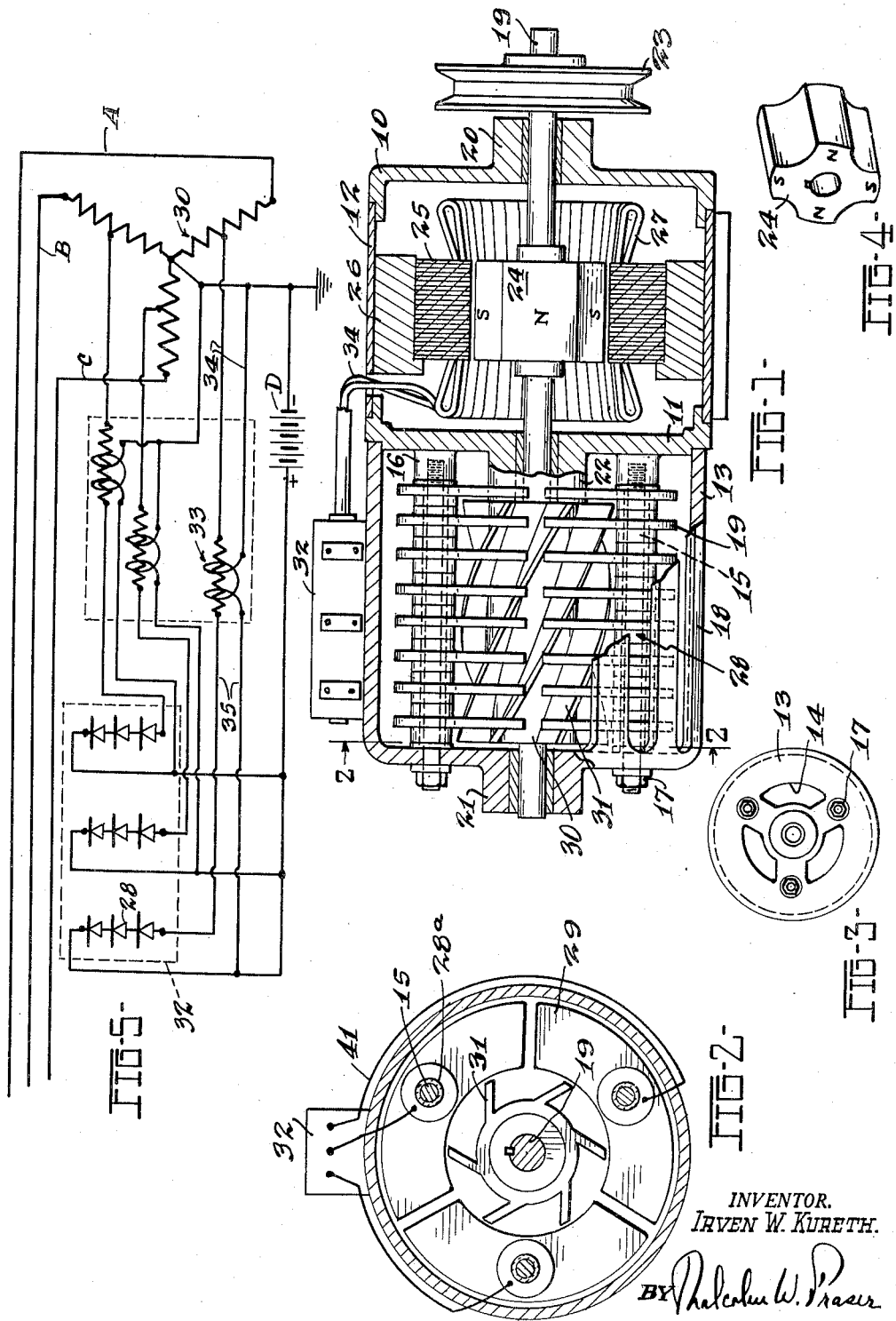

2,550,013

UNITED STATES PATENT OFFICE 2,550,013

DYNAMOELECTRIC MACHINE

Irven W. Kureth, Monroe, Mich.

Application August 6, 1948, Serial No. 42,773

3 Claims. (Cl. 171—252)

This invention relates to dynamo-electric machines, and an object is to produce a new and improved machine of this character producing both direct potential and alternating potential.

Another object is to provide a new and improved dynamo-electric machine which is simple in construction, inexpensive to manufacture, and in which the number of moving parts is reduced to a minimum.

Other objects and advantages will hereinafter appear, and for purposes of illustration but not of limitation, an embodiment of the invention is shown on the accompanying drawings, in which Figure 1 is a longitudinal sectional elevation of the dynamo-electric machine;

Figure 2 is a transverse sectional view on the line 2—2 of Figure 1;

Figure 3 is a reduced end elevation of the machine;

Figure 4 is an end perspective view of the rotor; and

Figure 5 is a wiring diagram.

The illustrated embodiment of the invention comprises a dynamo-electric machine having a housing consisting of two laterally spaced walls 10 and 11, between which is suitably clamped an annular wall 12. The housing also includes a bell-shaped end cap 13, the rear wall of which has a plurality of arcuate air vents 14. In this instance, three equidistantly spaced rods 15 fasten the end bell cap 13 to bosses 16 on the wall 11, nuts 17 being fastened on the outer ends of the rods 15 to retain the parts assembled. In the outer surface of the bell cap 13 are a series of longitudinally disposed ventilating slots 18.

Concentrically of the housing is a shaft 19, opposite end portions of which are mounted in bearings in bosses 20 and 21 in the wall 10 and the bell cap 12 respectively. The intermediate portion of the shaft 19 is mounted in a bearing in a boss 22 in the wall 11. Fixed to an end of the shaft 19 on the outside of the housing is a sheave 23, suitably connected to a source of power. Located between the walls 10 and 11 and keyed to the shaft 19 is a magnetized rotor 24, generally cross-shaped in cross section, adjacent arms of which are of opposite polarity. Surrounding the rotor 24 and for cooperation therewith is a stator 25 of laminated form mounted internally of and carried by an iron ring 26. The stator 25 is formed with a series of transverse slots and disposed in these slots is a three-phase winding 27.

Disposed within the ball cap 13 are three series of rectifier units or piles 28, each series being mounted upon one of the longitudinal rods 15. The rectifiers 28 are of the dry contact type, such as the well-known selenium disc type rectifier. Each rectifier 28 may conveniently consist of a pile of selenium discs 28a and interposed washers 28b, each disc 28a being pressed in a central opening in a metallic arcuate cooling fin or blade 29. The fins 29 are disposed along the rods 15 in parallel planes perpendicular to the axis of the shaft 19 and extend radially thereof. The rectifier discs 28 are considerably longer than the thickness of the fins 29 so that a substantial portion of each disc extends on opposite sides of the particular fin 31 on which it is mounted. Similar rectifier assemblies are mounted on the other two rods 15.

Disposed within the cylindrical cavity formed by the three series of cooling fins 29 and coextensively therewith is a longitudinally elongate cooling fan 30 having a plurality of helical blades 31. The fan 30 creates a stream of air through the vents 14 and 18 so as to carry away a substantial amount of heat from the fins.

Suitably mounted on the outer surface of the bell cap 13 is a casing 32 containing three voltage control units 33, each of which is electrically connected, as indicated at 34, to a phase of the three-phase stator winding 27 and also to one of the rectifier units, as indicated at 35.

It is manifest that I have produced a generator which is simple in design and can be produced economically on a large scale because of the interchangeable parts. It is obvious that there is great ease in assembly and disassembly. By the removal, in this instance, of three nuts 17, the bell cap 13 can be disengaged and thus the series of rectifiers 28 are accessible for the replacement of one or more cooling fins 29, rectifier discs 28a, or washers 28b. The support given to the rotor shaft 19 by its bearings in the end walls and bell cap respectively, affords an exceedingly well-balanced construction.

In the operation of the machine, the shaft 19 is rotated by any suitable means and the rotative movement of the rotor 24 causes its residual magnetism to induce an alternating potential in the polyphase winding 27, current from which is taken off through leads A, B and C (Figure 5) and assuming the rotor is driven at a rate of 1800 R. P. M., a 60 cycle current having a voltage of 110 is available for each of these leads. At least a portion of the alternating potential induced in the field winding 27 is converted to a unidirectional potential by the three sets of rectifier units 28, one being electrically connected to each phase of the polyphase field winding, or three in this embodiment. However, in order to control the voltage of the current supplied to each of the three rectifiers, a voltage control or saturable reactor 33 is interposed in the line between each rectifier unit 28 and the respective phase of the field winding. As shown, the voltage control is of a well-known type having concentric impedances connected respectively to the input and output of the rectifier unit, as well as the winding 27 and predetermines the voltage delivered to the storage battery D. Thus, for example, the current passing from the rectifier units 28 to the battery D may be maintained at about 20 volts regardless of the speed at which the rotor 24 is driven, and by employing a plurality of rectifier units, a much smoother rectified direct current is achieved.

It is to be understood that numerous changes in details of construction, arrangement and operation may be effected without departing from the spirit of the invention especially as defined in the appended claims.

What I claim is:

1. A dynamo-electric machine comprising a housing including a pair of upright end walls, an upright intermediate wall dividing said housing into two axial portions, and a side wall extending between said end walls, a rotor shaft extending from end to end in said housing, bearings in said upright walls rotatably supporting said shaft, means for rotating said shaft, a rotor and stator respectively mounted on said shaft and housed in one of said portions, said stator including a polyphase winding, a plurality of axially extending angularly spaced elongate piles of rectifier units substantially concentrically arranged around said rotor shaft within the other portion of said housing, electrical connections between the phases of said winding and said units, respectively, output connections for said units, said other portion of said housing having air vents therein, and an elongate cooling fan having helical blades mounted on said rotor shaft radially inward of said rectifier units 2. The combination claimed in claim 1, said rectifier units each comprising a plurality of rectifier disks piled on rods, said rods extending axially between said intermediate upright end wall of said other portion of said housing.

3. In the combination claimed in claim 2, metallic spacing washers between said rectifier disks, and substantially flat metallic cooling fins affixed to said disks, said fins having substantially arcuate inner edges concentrically arranged around said fan blades.

IRVEN W. KURETH.

REFERENCES CITED

The following references are of record in the file of this patent:

UNITED STATES PATENTS

| Number | Name | Date |
|---|---|---|
| 675,158 | Hubbard | May 28, 1901 |
| 1,899,741 | Bauer | Feb. 28, 1933 |
| 1,917,473 | Ohlsen et al. | July 11, 1933 |
| 2,017,255 | Norton | Oct. 15, 1935 |
| 2,117,018 | Conrad et al. | May 10, 1938 |
| 2,138,160 | Hansell | Nov. 29, 1938 |
| 2,295,916 | Schiff | Sept. 15, 1942 |
| 2,363,857 | Crever et al. | Nov. 28, 1944 |
| 2,377,930 | Fuller | June 12, 1945 |
| 2,383,669 | Moore | Aug. 28, 1945 |
| 2,393,044 | Harder | Jan. 15, 1946 |
| 2,486,656 | Klinkhamer | Nov. 1, 1949 |